United States Patent
Chen et al.

(10) Patent No.: US 11,036,760 B2
(45) Date of Patent: Jun. 15, 2021

(54) METHOD FOR PARALLEL MAINTENANCE OF DATA CONSISTENCY

(71) Applicant: SUZHOU SUPERBLOCK CHAIN INFORMATION SCIENCE & TECHNOLOGY CO., LTD., Suzhou (CN)

(72) Inventors: Guangyu Chen, Suzhou (CN); Xingguo Shi, Suzhou (CN)

(73) Assignee: SUZHOU SUPERBLOCK CHAIN INFORMATION SCIENCE & TECHNOLOGY CO., LTD., Suzhou (CN)

( * ) Notice: Subject to any disclaimer, the term of this patent is extended or adjusted under 35 U.S.C. 154(b) by 180 days.

(21) Appl. No.: 16/098,929

(22) PCT Filed: Mar. 23, 2017

(86) PCT No.: PCT/CN2017/077834
§ 371 (c)(1),
(2) Date: Nov. 5, 2018

(87) PCT Pub. No.: WO2018/006624
PCT Pub. Date: Jan. 11, 2018

(65) Prior Publication Data
US 2019/0205314 A1    Jul. 4, 2019

(30) Foreign Application Priority Data

Jul. 8, 2016  (CN) .......................... 201610537425.5

(51) Int. Cl.
G06F 16/27  (2019.01)
G06F 16/00  (2019.01)
(Continued)

(52) U.S. Cl.
CPC .......... *G06F 16/275* (2019.01); *G06F 9/5072* (2013.01); *G06F 16/00* (2019.01);
(Continued)

(58) Field of Classification Search
CPC ...... G06F 16/611; G06F 16/617; G06F 16/62; G06F 16/736; G06F 16/77
See application file for complete search history.

(56) References Cited

U.S. PATENT DOCUMENTS 6,292,880 B1 *  9/2001  Mattis ................. G06F 16/9574
                                                    711/216
6,954,776 B1 * 10/2005  Cruanes ............ G06F 16/24532
                                                    709/201

(Continued)

FOREIGN PATENT DOCUMENTS

CN   102739412 A    10/2012
CN   106202387 B  *  5/2019

*Primary Examiner* — Daniel A Kuddus
(74) *Attorney, Agent, or Firm* — SV Patent Service (57) ABSTRACT

A method for parallel maintenance of data consistency includes: 1) a node broadcasts requests to other nodes in a network, request a synchronization data block of current synchronization cycle, and calculates a synchronization anchor of this synchronization cycle; 2) for node i requiring data feeding, writing the synchronization anchor of the current synchronization cycle in data block $A_0$, and to produce an array $[A]_N$ based on the requirement; data block $A_0$ is the provision that is be added into consistency data in the current synchronization cycle; 3) each node builds its own array $[A]_N$ in parallel and broadcasts the array; and 4) the node filters all received arrays of $[A]_N$ by the synchronization anchor of array, discards invalid data, and thereafter builds the synchronization data block for the next synchronization cycle.

12 Claims, 5 Drawing Sheets

(51) Int. Cl.
*G06F 16/215* (2019.01)
*G06F 16/25* (2019.01)
*G06F 9/50* (2006.01)
*G06F 16/22* (2019.01)

(52) U.S. Cl.
CPC .......... *G06F 16/215* (2019.01); *G06F 16/25* (2019.01); *G06F 16/2255* (2019.01)

(56) References Cited

U.S. PATENT DOCUMENTS

| | | | | |
|---|---|---|---|---|
| 7,103,884 B2* | 9/2006 | Fellin | ............... | G06F 11/1443 717/169 |
| 7,159,211 B2* | 1/2007 | Jalan | ............... | G06F 8/456 712/31 |
| 7,353,509 B2* | 4/2008 | Sheehy | ............... | G06F 8/61 709/223 |
| 7,590,558 B2* | 9/2009 | Chinnappan | ............... | G06Q 30/06 705/26.8 |
| 7,590,668 B2* | 9/2009 | Kathuria | ............... | G06F 11/1461 |
| 7,613,770 B2* | 11/2009 | Li | ............... | H04L 67/104 709/203 |
| 7,756,051 B2* | 7/2010 | Rodriguez | ............... | H04L 69/329 370/252 |
| 7,848,261 B2* | 12/2010 | Fachan | ............... | H04L 67/1002 370/255 |
| 8,127,134 B2* | 2/2012 | Iyengar | ............... | H04L 9/3236 713/167 |
| 8,260,742 B2* | 9/2012 | Cognigni | ............... | G06F 16/27 707/620 |
| 8,352,690 B2* | 1/2013 | Forhan | ............... | G06F 3/00 711/156 |
| 2004/0172626 A1 | 9/2004 | Jalan | | |
| 2009/0157802 A1* | 6/2009 | Kang | ............... | G06F 16/275 709/203 |
| 2010/0257149 A1* | 10/2010 | Cognigni | ............... | G06F 16/27 707/698 |
| 2012/0254881 A1 | 10/2012 | Hamamoto | | |

* cited by examiner

METHOD FOR PARALLEL MAINTENANCE OF DATA CONSISTENCY

TECHNICAL FIELD

The invention relates to the field of computer technologies, and specifically relates to a data verification method, which can maintain global consistency in network distributed computing environment, and suitable for parallel computing process.

BACKGROUND OF THE INVENTION

Network Distributed Computing

Computing units in the network environment (including but not limited to computers) operate independently and perform specific computation tasks through specific communication protocols and application software. When distributed computing needs to rely on the same data set, all compute nodes rely on a centralized storage management mechanism to read and write the required data. This method of reading and writing data is applicable to the situation of fully managed computing. When there is no centralized storage management, although the existing data verification techniques can perform verification and error correction in data transmissions, due to the lack of a central node for tracing data consistency, the system can neither maintain the consistency of data obtained between nodes, nor resist malicious nodes from data interference.

Digital Signature

Digital Signature technology is the most popular data integrity protection solution which can produce a more reliable "data fingerprint" than human fingerprints. The data producer encrypts the information with its own private key, and the data receiver read and compares the data with the information decrypted by the producer's public key to verify the integrity of the information. This feature can also be used to verify data consistency. When a data set is verified use Digital signature, it is required to follow a certain serialized order at the time when data have being generated in order to produce the feature of data consistency. Parallel processing on same set of data by multiple nodes is not supported by this technique.

Digital Digest

It is a technique that transforms messages of different lengths into shorter messages of fixed length. It is similar to a function which use message as input argument and output is also a message, that is, a hash function. Digital digest use unidirectional Hash function to encrypt plaintext, like summarize it, into a ciphertext of fixed length (for example, 128 bits). Such ciphertext is also known as digital fingerprint, which is always produced with a fixed length. Digesting different plaintext will always produce different results. But the same plain text will always produce the same digital digest. As mentioned before, when using a digital digest to verify the consistency of a data set, it is also required to follow a specific serialized order. it may become a performance bottleneck under the situation of parallel processing by multiple nodes.

Peer-to-Peer Network and Hash Trees

Peer-to-peer network is a distributing computing solution, which has no privileged nodes or centralized control nodes and, which has computing nodes collaborating equally in a distributed computing environment. Peer-to-peer network may utilize hash trees to ensure the consistency of the shared data in the network, but this method can only verify statically stored data and cannot meet the requirements of dynamically verification in distributed computing.

Verification Linked List

Verification linked list applies specific rules to discrete data verification. It composes the verification data into a traceable linked list. To query and check the linked list can verify the consistency of the historical data (Reference: Haber, S.; Stornetta, W. S. (1991). "How to time-stamp a digital document", Journal of Cryptology 3 (2)), but such a linked list is only applicable to single computer or single network node context. For distributed computing environment, not only a central node is required to arbitrate the read/write processing of data, but also complicated synchronization locks are necessarily added to concurrent read/write requests to avoid data accessing conflicts and to process them into a serialized flow. This results in a very low read/write efficiency.

Big Data Technology

Big Data technology is increasingly used in Internet and distributed network applications to solve some specific problems in parallel data processing. Due to the discrete and unstructured nature of the big data of the Internet, Big Data technology applies redundant and distributed storage methods to guarantee data reliability and read/write performance. Meanwhile, it drops the constraints on the consistency of data relationships. Therefore, Big Data Technology needs to pay a notable cost to solve problems of data quality, especially the problems of data inconsistency (Reference: FAN W., GEERTS F., Foundations of data quality management [J]. Synthesis Lectures on Data Management, 2012, 4 (5): 1-217.). The most common solution adopts post-processing methods such as data cleaning (Reference: Fan Ling, MAP-REDUCE-based big data inconsistency resolution algorithm, 2015 Microcomputer and Application No. 15; RAHM E, DO H H. Data cleaning: Methods and current approaches [J]. IEEE Data Eng. Bull., 2000, 23 (4): 3-13.), it is still not possible to generate corresponding verification information of data consistency at the time when data is generated.

In summary, the existing solutions of distributed computing by multiple nodes have to rely on centralized storage and serialization processing to solve data inconsistency problems. In decentralized computing context, on one hand, data consistency maintenance relies on serialized operations on data process. The serialization method will block operations of other nodes, such that those nodes without context dependencies often have to wait for the completion of operations of other nodes. This greatly reduces operational efficiency. On the other hand, Apply post-processing methods to solve data inconsistency problems cannot meet the requirement of real-time operating data in distributed systems.

SUMMARY OF THE INVENTION

When multiple nodes simultaneously operate the global data Increment in a distributed system, serializing operations often have to be introduced to maintain the data consistency, but this serialization reduces system efficiency.

Figure 1:
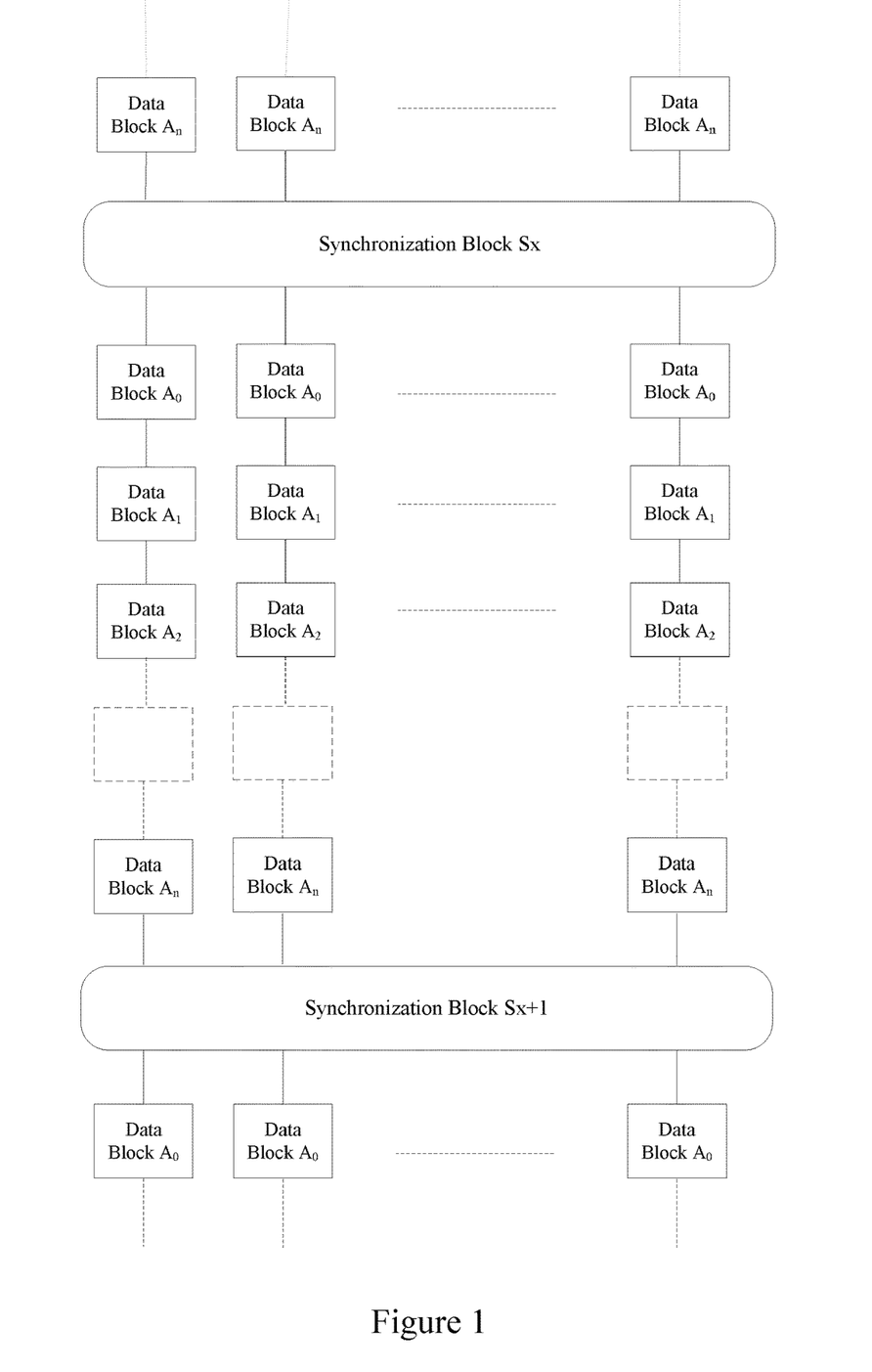
FIG. 1 illustrates the structural relationship between the synchronization blocks and the node-stored data in present invention. The data block $A_n$ is a data structure having both predecessor and successor relationship; The synchronization block $S_x$ is a periodically generated data block, which partitions the continuously growing array of $A_n$; Multiple data block array $A_n$ may be generated and grown in parallel between the synchronization blocks.

The invention provides a data consistent verification reference for parallel data operations by introducing a synchronization block mechanism in data structure, such that maintaining data consistency is realized when multiple nodes are processing the incremental global data in parallel. More specifically, the synchronization block is generated by the participating nodes accepted the public data structure. The data structure relationship between the synchronization block and the node data is as shown in FIG. 1. The unique digital feature (such as a digital digest) of the synchronization block $S_x$ of the x-th synchronization cycle is used as a data dependency reference (called synchronization anchor in the invention) to the arrays of all subsequent data blocks of the (x+1)-th synchronization cycle $[A]_N$. Any number of data block arrays $[A]_N$ are allowed to exist in between synchronization block $S_x$ and synchronization block $S_{x+1}$ of the two consecutive synchronization cycle. Each data block array $[A]_N$ is composed of a plurality of data blocks $[A]$, and the subsequent data block $A_{[n]}$ contains a digital digest of its preceding data block $A_{[n-1]}$. Since multiple data blocks of $[A]_N$ are allowed to exist at the same time, when computing nodes in the network are generating $[A]_N$ by themselves, the parallel data generating process can be mutually independent. The synchronization block help verify and consolidate the dependencies between each of the incremental data and provides dependency references for all of the subsequent incremental data so that the data between each synchronization block can be generated fully in parallel, meanwhile the whole data structure keeps the global consistency in data dependency relationship.

The technical solution of the present invention is as follows:

A method of parallel maintenance of data consistency can include the following steps:

1) A node broadcasts requests to other nodes in a network, asking for a synchronization data block of current synchronization cycle, and calculates a synchronization anchor of this synchronization cycle. If the expecting synchronization data block did not obtained, the node calculate a synchronization anchor based on the synchronization data block stored itself, or it initializes a new block $S_0$ of synchronization and its synchronization anchor, which is used as the synchronization anchor of the current synchronization cycle;

2) for each node i requiring data feeding, writing the synchronization anchor of the current synchronization cycle in data block $A_0$, and generating data blocks of $A_1$, $A_2$, ..., $A_n$ based on the requirement to produce an array $[A]_N$, wherein data block $A_0$ is the provision that is to be added into consistency data in the current synchronization cycle, wherein data block $A_n$ is the n-th data block in array $[A]_N$; 3) Each node builds its own array $[A]_N$ in parallel and broadcasts the array. 4) node filter all received arrays of $[A]_N$ by the synchronization anchor of array, discards invalid data, and thereafter builds the synchronization data block for the next synchronization cycle.

Further, wherein the synchronization anchor is the unique digital feature of a synchronization data block, wherein the unique digital feature of the synchronization block $S_x$ of the x-th synchronization cycle will be used as the synchronization anchor for all arrays of subsequent data blocks in the (x+1)-th synchronization cycle.

Further, wherein the synchronization block $S_x$ of the x-th synchronization cycle contains the unique digital feature of synchronization block $S_{x-1}$ of the previous synchronization cycle, user customization data, and self-verification data of block $S_x$.

Further, wherein the synchronization block $S_x$ of the x-th synchronization cycle contains the synchronization block identifier of the synchronization block $S_{x-1}$ of the previous synchronization cycle.

Further, wherein in the method step 2), while building the array $[A]_N$, the data block $A_n$ generated by the n-th operation contains the unique digital feature of the data block $A_{n-1}$ generated by last operation, wherein $A_1$ contains the unique digital feature of $A_0$.

Further, wherein there are a number of data block arrays $[A]_N$ between the synchronization block $S_x$ and the synchronization block $S_{x+1}$ of the two consecutive synchronization cycles, wherein each data block array $[A]_N$ includes a number of data blocks $[A]$, wherein the subsequent data block $A_n$ contains the unique digital feature of its preceding data block $A_{n-1}$, wherein $A_1$ contains the unique digital feature in $A_0$.

Further, wherein the data block $A_0$ contains the data of synchronization anchor and synchronization block identifier, user customization data, and self-verification data of the data block $A_0$, wherein $A_n$ contains the unique digital feature of $A_{n-1}$, user customization data, and self-verification data of the data block $A_n$, wherein $A_1$ contains the unique digital feature of $A_0$ user customization data, and self-verification data of the $A_1$.

Further, wherein in the method step 2), node i independently generates a number of data blocks to be added to array $[A]_N$.

Further, wherein in the method step 2), node i collaborating with other nodes in the network to generate a number of data blocks to be added to array $[A]_N$.

Further, wherein in the method step 4) the method of determining whether the received arrays of $[A]_N$ has the same synchronization anchor or not can be the following steps: If the first data block $A_0$ of the two arrays of $[A]_N$ have the same synchronization anchor data, it is decided that the two arrays of $[A]_N$ have the same synchronization anchor and both of them belong to the same synchronization cycle.

Further, wherein the synchronization anchor of synchronization block $S_0$ of the very first synchronization cycle is the calculation result by applying a digital feature algorithm to data block $S_0$.

Further, wherein if the node i did not successfully complete the data addition to $[A]_N$ by the end of the x-th synchronization cycle, in the (x+1)-th synchronization cycle, the synchronization anchor of the data synchronization block of the (x+1)-th synchronization cycle is to be used to rebuild $[A]_N$, and added to the consistency data of the (x+1)-th synchronization cycle.

The present disclosure include the following advantages compared with the conventional techniques:

In the case of no centralized control node, the data read and written by each node in parallel are lack of trustable basis. The present invention is designed to have a data consolidating effect by inserting a periodical synchronization block structure into the data structure. This consolidation provides each node operating in parallel with deterministic trustable data. However, such a data structure does not require a central node to maintain and is stored and maintained by all nodes.

When the method of the present invention is used to construct common data required data consistency, during the time other than the generation of the synchronization block, the nodes can generate common data in parallel but has no impact to each other, this is greatly improves the parallelism of the common data processing.

For example, a network have i nodes that each generates 100 data blocks by itself, 100*i data blocks are generated in parallel. Assuming there are no computational dependency between each of the i nodes, which is a common case of big data computational environment of the Internet, namely, stateless computing. In order to build data consistency of common data, a verification relationship of uniqueness is required to be established for the set of data when the method of the present invention is not used. Such a verification relationship must be constructed in a one-dimensional serialized data structure. Assuming that each maintenance operation of this serialized structural data set takes 1 millisecond, it will take 100*i milliseconds in total. Maintaining this serialized data structure must be coordinated by the wait queue managed by the central control node. theoretically, the computational complexity of time is O(n), that is, under the worst case a node has to waiting for 100*i−1 milliseconds. The average wait time of a node is 100*i/2−1 milliseconds.

When the method of the present invention is adopted, the central control node coordination is not required by these i nodes. All these nodes can fetch the synchronization anchor of current cycle in parallel through broadcasting, and start to maintain the data set independently. Under the same conditions as above, that a node completes the data generation takes 100 milliseconds and it does not change with the increasing or decreasing of the variable i; In order to consolidate the generated data together, these i nodes still need to collaboratively generate a new synchronization block, so that these i nodes need to exchange data of each own through broadcast and generate a new synchronization block with joint efforts. Theoretically this operation's computational complexity of time is O(1), which means it can completes in a fixed period of time. Furthermore, as the number i becomes larger, the relative efficiency goes higher. Therefore, the total time spent on data maintenance is 100+2c milliseconds (where c is a constant, represents the time to fetch the synchronization anchor and generate the next synchronization anchor). This parallel approach performs better than the traditional centralization methods, and it also prevents the single point failure caused by centralization from happening.

BRIEF DESCRIPTION OF THE DRAWINGS

FIG. 2 illustrates the data structure of the present invention. The synchronization block $S_x$ contains the unique digital feature of the previous synchronization block $S_{x-1}$, and further contains a unique identifier, user customization data, and self-verification data of the synchronization block. The data block $A_0$ contains data records of a synchronization anchor and synchronize block identifier, identifier of itself, user customization data, and self-verification data; The data block $A_n$ (n>0) contains the unique digital feature of $A_{n-1}$ and the synchronization block identifier, identifier of itself, user customization data, and self-verification data. The synchronization anchor data records the synchronization anchor of the synchronization block to which the data block $A_0$ belongs. The synchronization block identifier records the identifier of the synchronization block to which the data block $A_0$ belongs.

DETAILED DESCRIPTION OF IMPLEMENTATIONS

The technical content of the present invention will be further described in detail with reference to the accompanying drawings.

Implementation Method 1

In an open network environment, when there is no available synchronization anchor in the network, there are n nodes waiting for feeding data and maintaining data consistency.

Figure 2:
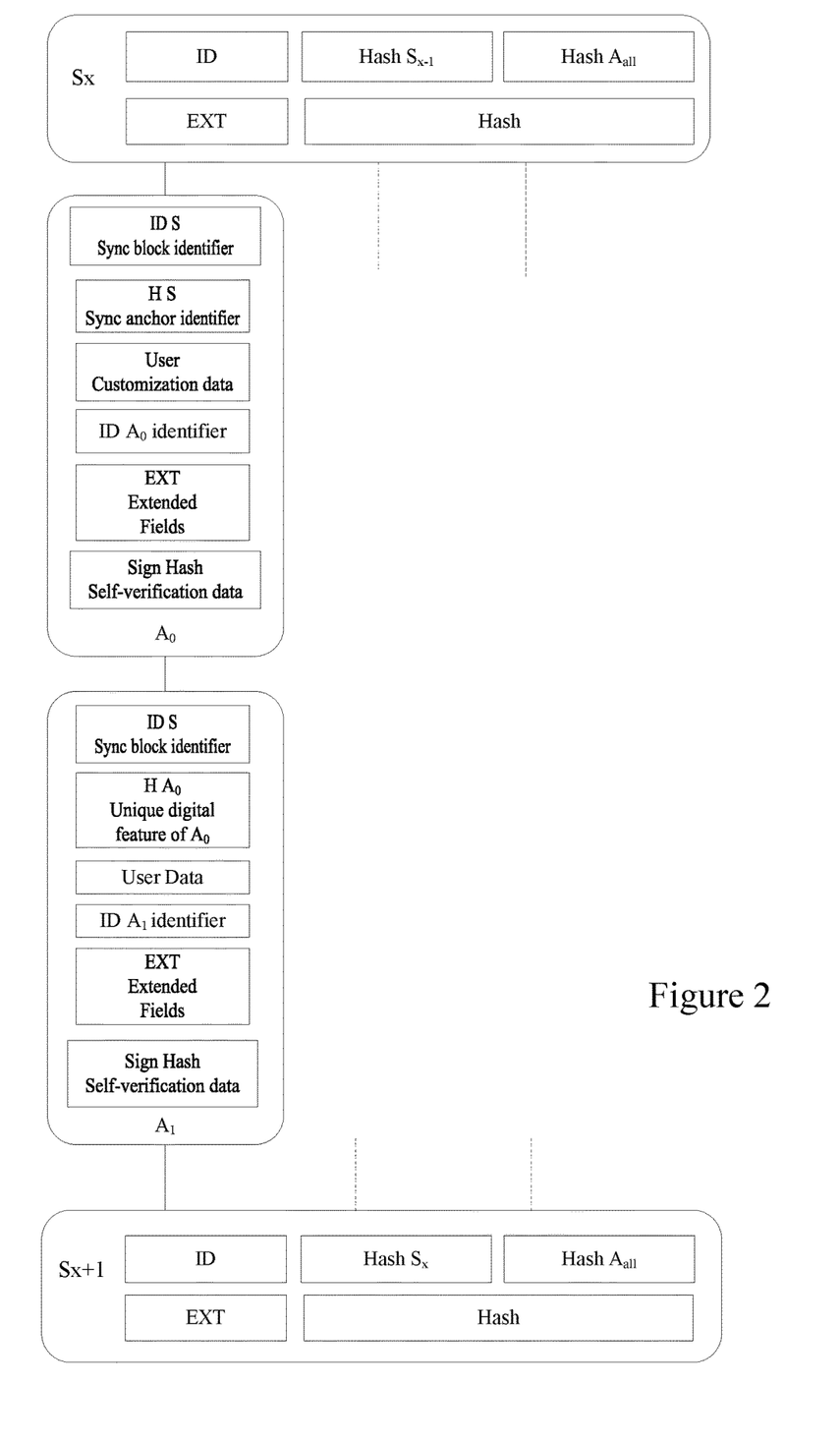
Figure 3:
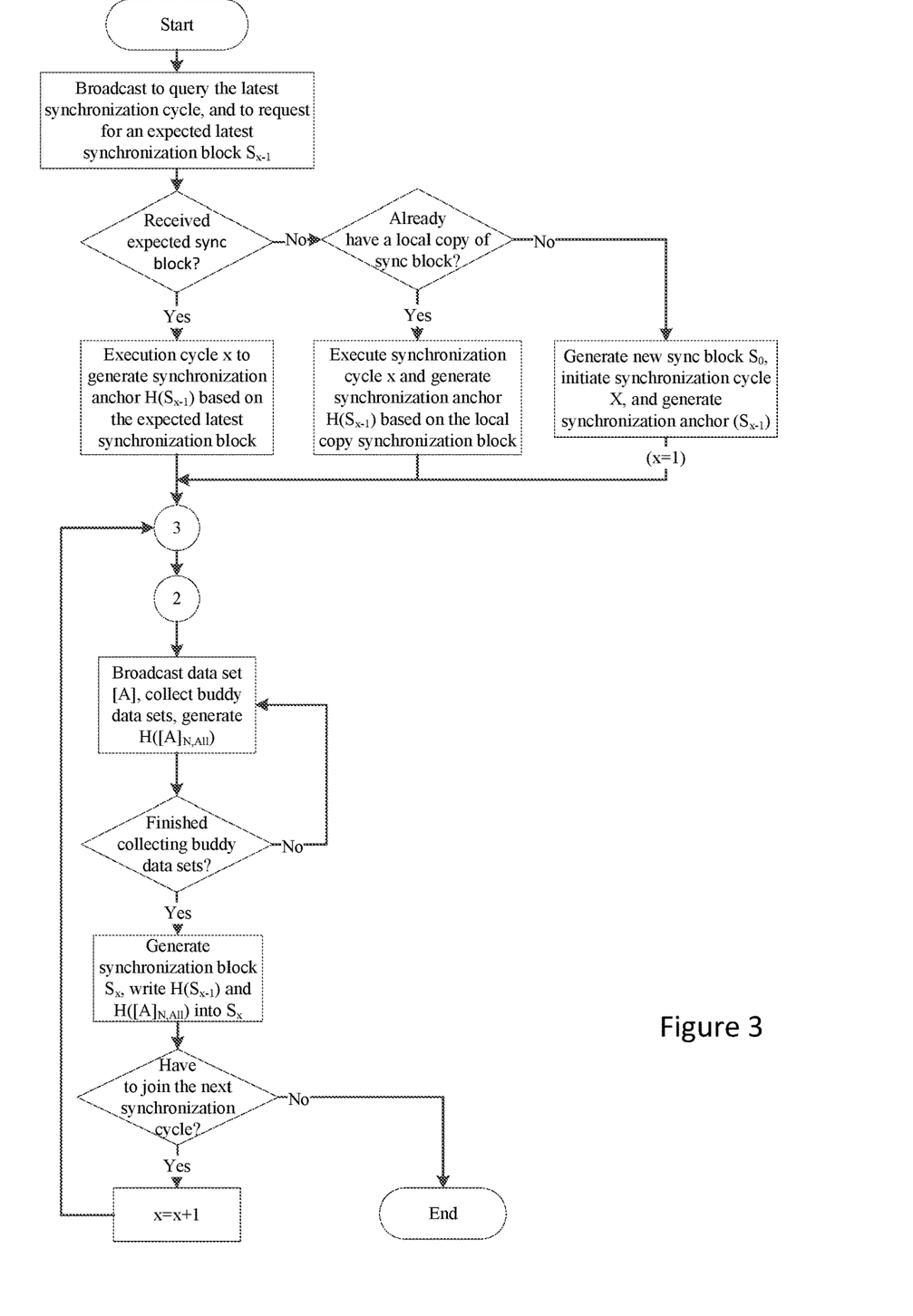
FIG. 3 is a flowchart for a typical process of parallel maintenance of data consistency.
Figure 4:
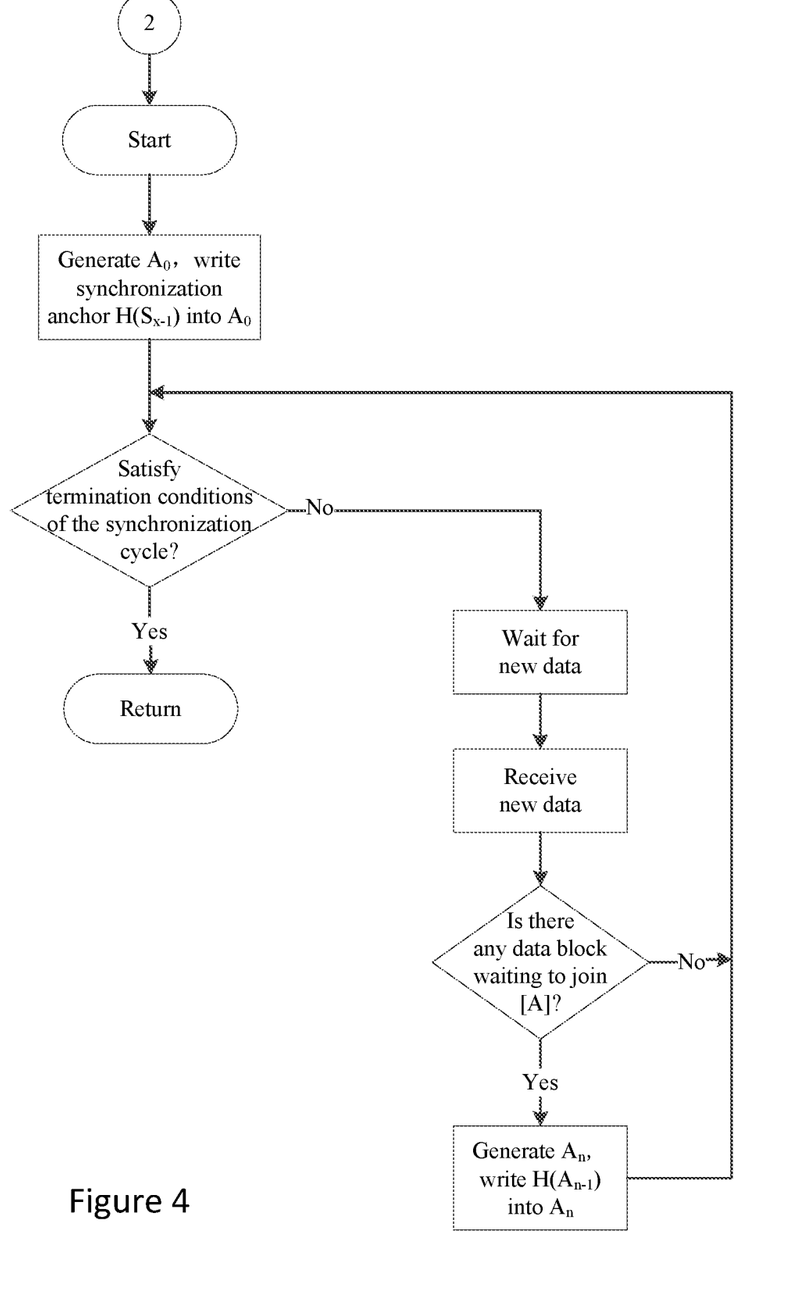
FIG. 4 is a flowchart for generating array of $[A]_N$ for consistency data.

1. As shown in FIG. 3, these n nodes having data maintenance demands broadcast queries for synchronization cycle to other nodes in the network, requesting to fetch the latest synchronization block. The broadcasting packets of the queries contains information of the node itself, the data structure desired to be maintained, required version, and communication protocol. They are received and interpreted by nodes running the same computing software on the network. Those nodes holding the corresponding synchronization blocks and the synchronization anchors will respond to the requests of query and reply to the requesting nodes with the latest available synchronization block;

2. If the desired synchronization block did not obtained within a given period of time, each of these n nodes initializes a new synchronization block $S_0$, the internal structure of data fields of $S_0$ is as shown in FIG. 2, and generates Hash ($S_0$) as the first synchronization anchor for the very first synchronization. thereafter, these n nodes broadcast synchronization block of each self to others;

3. Each of these n nodes demanding data feeding and maintenance records the synchronization anchor obtained by listening to broadcasts, decides which synchronization anchor to accept, and writes the synchronization anchor into the local node data block $A_0$ as shown in FIG. 4;

4. Taking any node i as an example, the node i grows the data block group [A] to the length of $[A]_N$ as demand, by:

a) generating $A_1$ independently or collaborating with other nodes, wherein $A_1$ contains the digital digest of $A_0$;

b) generating $A_n$ independently or collaborating with other nodes, wherein $A_1$ contains the digital digest of $A_{n-1}$; and c) repeating the above steps till [A] grows to the expected length of the node, arrives the array $[A]_N$.

Figure 5:
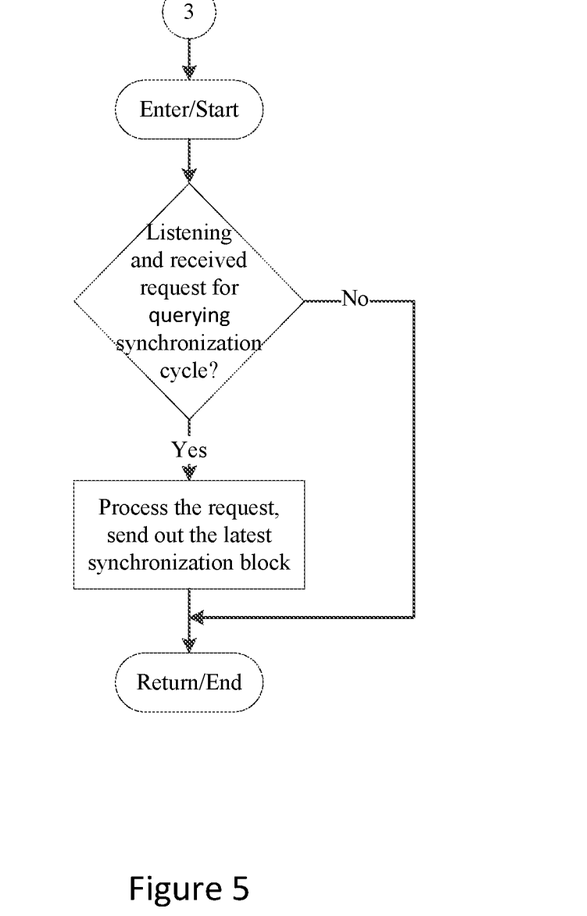
FIG. 5 is a flowchart for a node responding to a broadcasting request of synchronization block fetching.

5. Under a parallel computing context, each node completes the construction of data $[A]_N$ respectively. At the same time, each node responds to query requests for the synchronization cycle from other nodes, so that other nodes can join this synchronization cycle in parallel (as shown in FIG. 5). The nodes holding the same synchronization anchor collect all $[A]_N$ by broadcasting among them, discard invalid data, calculate Hash ($[A]_{N,\ all}$). If the first data blocks $A_0$ of a group of $[A]_N$ contains the same synchronization anchor, it is then determined that these $[A]_N$ are subsequent data to the same synchronization block.

6. Each of the n nodes constructs a new synchronization block $S_1$ respectively. The data structure of the synchronization block $S_1$ is as shown in FIG. 2. Hash ($[A]_{N, all}$) will be written into $S_1$. After rest of data calculations finished in $S_1$, $S_1$ is legitimately generated;

7. The synchronization block $S_1$ is determined as the new synchronization block, a hash ($S_1$) is generated as the new synchronization anchor, the new synchronization cycle are started based on this new synchronization anchor.

Implementation Method 2

In an open network environment, there already exists available synchronization anchors in the network, and there exists n nodes demanding data feed and maintenance.

1. As shown in FIG. 3, these n nodes demanding data maintenance broadcast queries for synchronization cycle to other nodes in the network, requesting to fetch the latest synchronization block. The broadcast packets for the queries containing information of node itself, data structure desired to be maintained, required version information, and communication protocol, are received and interpreted by nodes running the same computing software in the network. Those nodes holding the corresponding synchronization block and the synchronization anchor responds to the queries and reply to the requesting nodes with the latest available synchronization block;

2. These nodes demanding data maintenance receive a desired synchronization block $S_{x-1}$ within the given period of time. The n nodes record the synchronization block respectively, generate the corresponding synchronization anchor Hash($S_{x-1}$), and write it into the data blocks $A_0$ of the nodes itself (as shown in FIG. 4);

3. Taking any node i as an example, the node i grows the data block group [A] to the length of $[A]_N$ as demand, by:

a) generating $A_1$ independently or collaborating with other nodes, wherein $A_1$ contains the digital digest of $A_0$;

b) generating $A_n$ independently or collaborating with other nodes, wherein $A_1$ contains the digital digest of $A_{n-1}$; and c) repeating the above steps till [A] grows to the expected length of the node.

4. Under a parallel computing context, each node completes the construction of data $[A]_N$ respectively. At the same time, each node responds to query requests for the synchronization cycle from other nodes, so that other nodes can join this synchronization cycle in parallel (as shown in FIG. 5). The nodes holding the same synchronization anchor collect all $[A]_N$ by broadcasting among them, discard invalid data, calculate Hash ($[A]_{N, all}$). If the first data blocks $A_0$ of a group of $[A]_N$ contains the same synchronization anchor, it is then determined that these $[A]_N$ are subsequent data to the same synchronization block.

5. Each of the n nodes constructs a new synchronization block $S_x$ respectively. The data structure of the synchronization block $S_x$ is as shown in FIG. 2. Hash ($[A]_{N, all}$) will be written into $S_x$. After rest of data calculations finished in $S_x$, $S_x$ is formally generated;

6. The synchronization block $S_x$ is determined as the new synchronization block, a hash ($S_x$) is generated as the new synchronization anchor, repeating from the step 2 to start the new synchronization cycle.

Implementation Method 3

In an open network environment, there already exists historical stored synchronization anchors in the network, and there exists n nodes demanding data feed and maintenance.

1. As shown in FIG. 3, these n nodes demanding data maintenance broadcast queries for synchronization cycle to other nodes in the network, requesting to fetch the latest synchronization block. The broadcast packets for the queries containing information of node itself, data structure desired to be maintained, required version information, and communication protocol, are received and interpreted by nodes running the same computing software in the network. Those nodes holding the corresponding synchronization block and the synchronization anchor responds to the queries and reply to the requesting nodes with the latest available synchronization block;

2. These nodes demanding data maintenance does not receive a desired synchronization block within the given period of time. The n nodes determines the local stored synchronization block as synchronization block $S_{x-1}$, generate the corresponding synchronization anchor Hash($S_{x-1}$), and write it into the data blocks $A_0$ of the nodes itself (as shown in FIG. 4);

3. Taking any node i as an example, the node i grows the data block group [A] to the length of $[A]_N$ as demand, by:

a) generating $A_1$ independently or collaborating with other nodes, wherein $A_1$ contains the digital digest of $A_0$;

b) generating $A_n$ independently or collaborating with other nodes, wherein $A_1$ contains the digital digest of $A_{n-1}$; and c) repeating the above steps till [A] grows to the expected length of the node.

4. Under a parallel computing context, each node completes the construction of data $[A]_N$ respectively. At the same time, each node responds to query requests for the synchronization cycle from other nodes, so that other nodes can join this synchronization cycle in parallel (as shown in FIG. 5). The nodes holding the same synchronization anchor collect all $[A]_N$ by broadcasting among them, discard invalid data, calculate Hash ($[A]_{N, all}$). If the first data blocks $A_0$ of a group of $[A]_N$ contains the same synchronization anchor, it is then determined that these $[A]_N$ are subsequent data to the same synchronization block.

5. Each of the n nodes constructs a new synchronization block $S_x$ respectively. The data structure of the synchronization block $S_x$ is as shown in FIG. 2. Hash ($[A]_{N, all}$) will be written into $S_x$. After rest of data calculations finished in $S_x$, $S_x$ is formally generated;

6. The synchronization block $S_x$ is determined as the new synchronization block, a hash ($S_x$) is generated as the new synchronization anchor, repeating from the step 2 to start the new synchronization cycle.

Implementation Method 4

In an open network environment, when there is no available synchronization anchor in the network, there are n nodes waiting for feeding data and maintaining data consistency. The dependencies of synchronization anchor between each data block are build up against specific implementations from abstract rules.

1. As shown in FIG. 3, these n nodes having data maintenance demands broadcast queries for synchronization cycle to other nodes in the network, requesting to fetch the latest synchronization block. The broadcasting packets of the queries contains information of the node itself, the data structure desired to be maintained, required version, and communication protocol. They are received and interpreted by nodes running the same computing software on the network. Those nodes holding the corresponding synchronization blocks and the synchronization anchors will respond to the requests of query and reply to the requesting nodes with the latest available synchronization block;

2. If the desired synchronization block did not obtained within a given period of time, each of these n nodes initializes a new synchronization block $S_0$, the internal structure of data fields of $S_0$ is as shown in FIG. 2, and generates Hash($S_0$) as the first synchronization anchor for the very first synchronization. thereafter, these n nodes broadcast synchronization block of each self to others;

3. Each of these n nodes demanding data feeding and maintenance records the synchronization anchor obtained by listening to broadcasts, decides which synchronization anchor to accept, and writes the synchronization anchor into the local node data block $A_0$ as shown in FIG. 4;

4. Taking any node i as an example, the node i grows the data block group [A] to the length of $[A]_N$ as demand, with the following method:

a) define $\{f_j\}_x$ as a set of rules of digital feature dependency.

b) generating $A_0, A_1 \ldots A_N$, independently or by collaborating with other nodes, define the data block set as $[A]_N = \{A_0, A_1, \ldots, A_N\}$, and the corresponding digital feature set as $F\{[A]_N\} = \{F_{A0}, F_{A1}, \ldots, F_{AN}\}$. Likely, The synchronization block defined as $S_{(x-1)}$ and its digital signature as $F_{S(x-1)}$. For the digital feature set $F\{[A]_N\}$, $\varphi_N$ is defined as the power set of $F\{[A]_N\}$ without the empty set, that is $\varphi_N = P(F\{[A]_N\}) - \emptyset$, and similarly, $\varphi_{N-1} = P(F\{[A]_{N-1}\}) - \emptyset \ldots, \varphi_0 = P(F\{[A]_0\}) - \emptyset$. The dependency can be given by following dependency rules, such as $F_{AN} = f_1(i, \varphi_{N-1}, F_{S(x-1)})$, or $F_{AN} = f_2(i, \varphi_{N-1})$, or $F_{AN} = f_3(\varphi_{N-1}, F_{S(x-1)})$, or $F_{AN} = f_4(\varphi_{N-1})$. $F\{[A]_N\} = F\{[A]_{N-1}\} \cup \{F_{AN}\}$, where i is the identifier of node i.

c) For any data block [A] in $[A]_N$, when [A] is composed by element in data set $\{B_M | M>1, M \in \text{natural numbers set}\}$, that is $[A] = [B]_M$. The corresponding digital feature is $F_{[A]}$, and the digital feature set is $F\{[B]_M\} = \{F_{B_M} | M>1, M \in \text{natural number set}, F_{BM}$ is the digital feature of data block $B_M\}$, the dependency is given by the following dependency rules, such as $F_{[A]} = f_5(F\{[B]_M\}, F_{S(x-1)})$, or $F_{[A]} = f_6(F\{[B]_M\})$, or $F_{[A]} = f_7([A])$.

5. Under the condition of parallel computing, each node completes the construction of data $[A]_N$ for the node itself respectively. All the nodes that have the same synchronizations anchor collect all $[A]_N$ by broadcast, discard invalid data, arrive at a legitimate digital feature set of $F\{[A]_{all}\}$ which is accepted by each node.

6. These n nodes independently build a new synchronization block $S_x$ by using $F\{[A]_{all}\}$.

7. The synchronization block $S_x$ is determined as the new synchronization block, and $F_{Sx} = f_8(S_x)$ is calculated and set as the new synchronization anchor, which is used to start a new synchronization cycle.

What is claimed is:

1. A method for parallel maintenance of data consistency, comprising:

1) broadcasting requests by a node to other nodes in a network, to request a synchronization data block of current synchronization cycle, and calculating a synchronization anchor of the synchronization cycle, when the synchronization data block is obtained, calculating by the node a synchronization anchor based on a stored synchronization data block, or initializing a new block $S_0$ of synchronization and an associated synchronization anchor, which is used as the synchronization anchor of the current synchronization cycle;

2) for each node i requiring data feeding, writing the synchronization anchor of the current synchronization cycle in data block $A_0$, and generating data blocks of $A_1, A_2, \ldots, A_N$ based on the requirement to produce an array $[A]_N$, wherein data block $A_0$ is a provision that is to be added into consistency data in the current synchronization cycle, wherein data block $A_n$ is the n-th data block in array $[A]_N$, wherein the data block $A_0$ includes synchronization anchor data that records the synchronization anchor of the synchronization block, wherein there are a number of data block arrays $[A]_N$ between the synchronization block $S_x$ and the synchronization block $S_{x+1}$ of two consecutive synchronization cycles, wherein in the array $[A]_N$, data block $A_n$ contains a unique digital feature of a preceding data block $A_{n-1}$, wherein $A_1$ contains a unique digital feature in $A_0$, wherein the synchronization block $S_x$ of the x-th synchronization cycle includes a unique digital feature of synchronization block $S_{x-1}$ of a previous synchronization cycle and user customization data of the synchronization block $S_x$;

3) building by each node, an array in parallel, and broadcasting array $[A]_N$; and 4) filtering at each all received arrays of $[A]_N$ by the synchronization anchor of array $[A]_N$, discarding invalid data, to build the synchronization data block for a next synchronization cycle.

2. The method according to claim 1, wherein the synchronization anchor is a unique digital feature of a synchronization data block, wherein the unique digital feature of the synchronization block $S_x$ of the x-th synchronization cycle is used as the synchronization anchor for all arrays of subsequent data blocks in the (x+1)-th synchronization cycle.

3. The method according to claim 1, wherein the data block $A_0$ further includes a synchronization block identifier, an identifier of the data block $A_0$, user customization data, and self-verification data, wherein the synchronization block $S_x$ of the x-th synchronization cycle includes self-verification data of block $S_x$.

4. The method according to claim 1, wherein the synchronization block $S_x$ of the x-th synchronization cycle contains a synchronization block identifier of the synchronization block $S_{x-1}$ of the previous synchronization cycle.

5. The method according to claim 1, wherein in step 2), while building the array $[A]_N$, the data block $A_n$ generated by the n-th operation contains a unique digital feature of the data block $A_{n-1}$ generated by a preceding synchronization cycle, wherein $A_1$ contains a unique digital feature of $A_0$.

6. The method according to claim 1, wherein the data block $A_0$ contains synchronization anchor and synchronization block identifier, user customization data, and self-verification data of the data block $A_0$, wherein $A_n$ contains a unique digital feature of $A_{n-1}$, user customization data, and self-verification data of the data block $A_n$, wherein $A_1$ contains a unique digital feature of $A_0$, user customization data, and self-verification data of the $A_1$.

7. The method according to claim 6, wherein the data block $A_0$ includes an identifier of the data block $A_0$, wherein the data block $A_n$ includes an identifier of the data block $A_n$.

8. The method according to claim 1, wherein in step 2), node i independently generates a number of data blocks to be added to array $[A]_N$.

9. The method according to claim 1, wherein in step 2), node i collaborates with other nodes in the network to generate a number of data blocks to be added to array $[A]_N$.

10. The method according to claim 1, wherein the step 4) further comprises:

determining whether the received arrays of $[A]_N$ has the same synchronization anchor or not, comprising:

when the data block $A_0$ of the two arrays of $[A]_N$ have the same synchronization anchor data, determining that the two arrays of $[A]_N$ have the same synchronization anchor and the two arrays of $[A]_N$ both belong to the same synchronization cycle.

11. The method according to claim 1, wherein the synchronization anchor of synchronization block $S_0$ of a first synchronization cycle is calculated by applying a digital feature algorithm to data block $S_0$.

12. The method according to claim 1, wherein when node i does not complete the data addition to $[A]_N$ by an end of the x-th synchronization cycle, in the (x+1)-th synchronization cycle, the synchronization anchor of the data synchronization block of the (x+1)-th synchronization cycle is used to rebuild $[A]_N$, and added to consistency data of the (x+1)-th synchronization cycle.

* * * * *